Dec. 4, 1934. J. F. ROBB 1,982,928
FIFTH WHEEL CONSTRUCTION
Filed Aug. 1, 1933 3 Sheets-Sheet 1
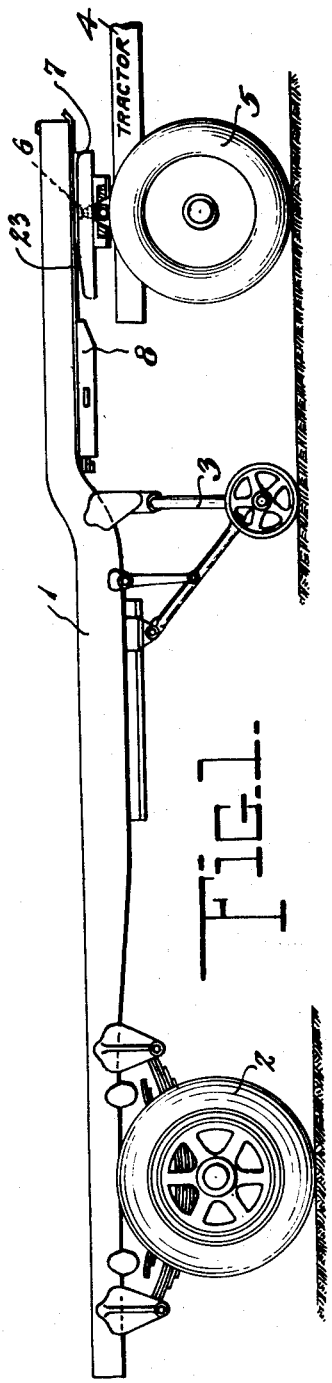
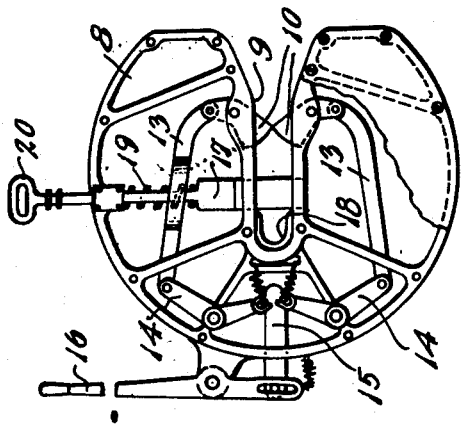
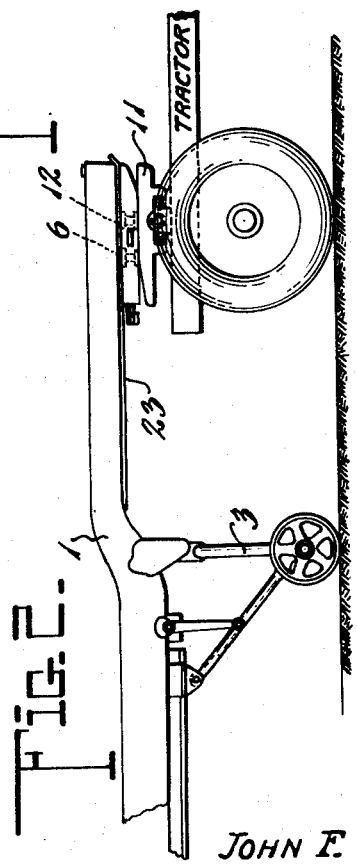
Inventor
JOHN F. ROBB.

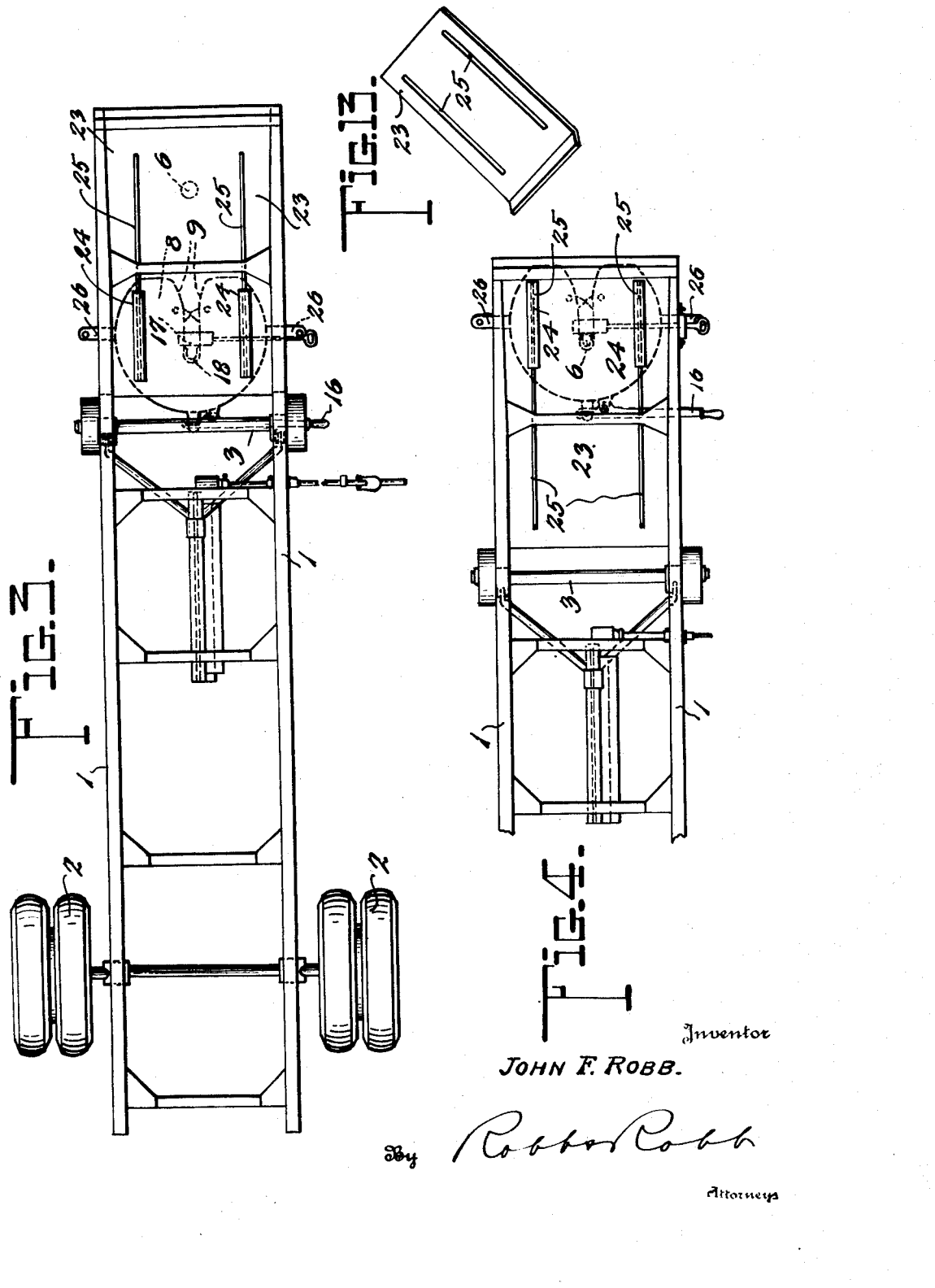

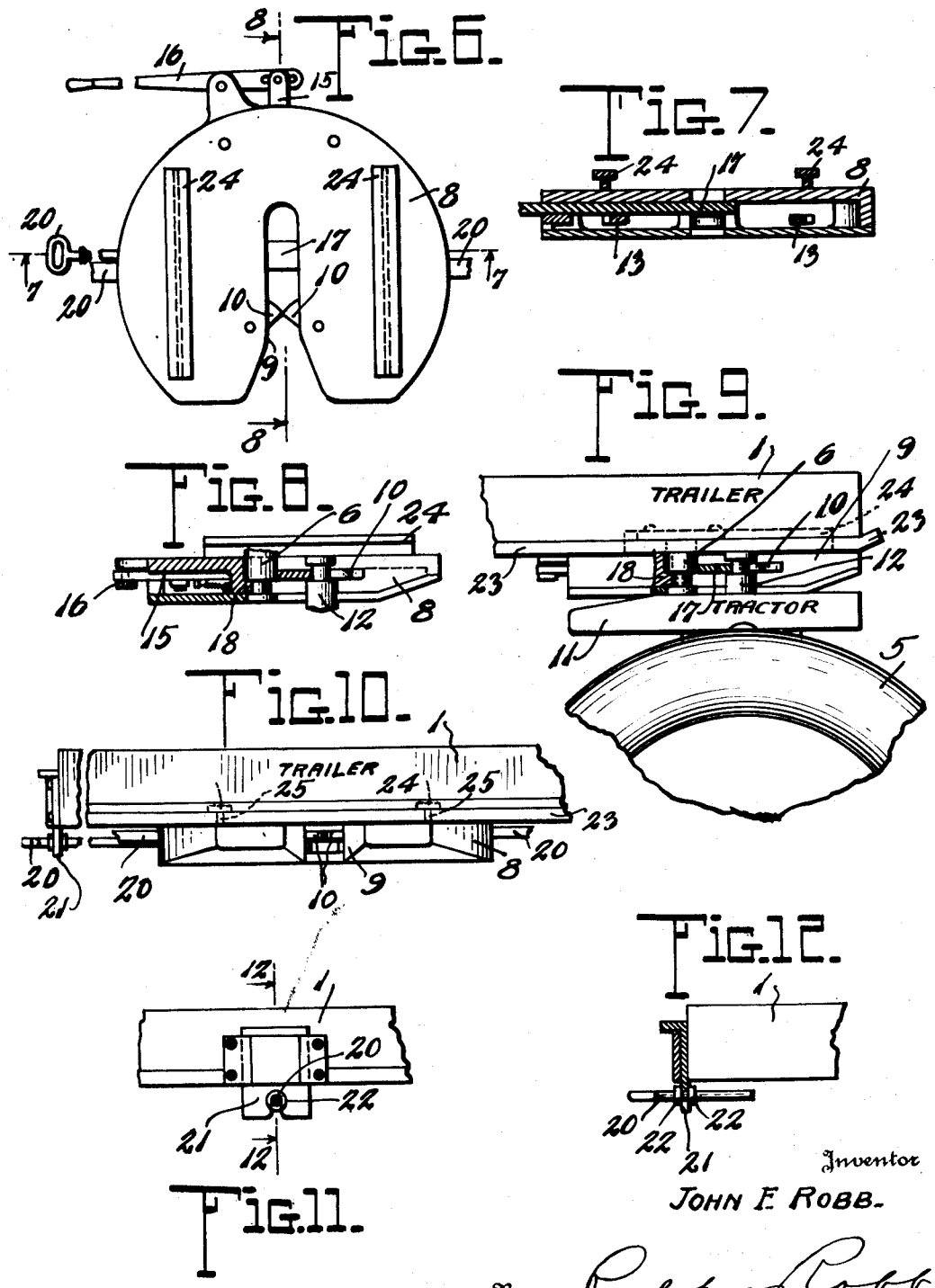

Patented Dec. 4, 1934

1,982,928

UNITED STATES PATENT OFFICE 1,982,928

FIFTH WHEEL CONSTRUCTION

John F. Robb, Cleveland Heights, Ohio, assignor to Highway Trailer Company, Edgerton, Wis., a corporation Application August 1, 1933, Serial No. 683,209

7 Claims. (Cl. 280—33.1)

This invention appertains to the art of tractor-trailer combination vehicles of the six-wheel type so common in the art. In these vehicles the trailer is provided with two main ground wheels near its rear end and a coupling part at its front end to coact with coupling means carried by a fifth wheel disposed upon the tractor section of the vehicle which is usually a four-wheel automobile designed for trailer pulling purposes.

Now in the practical art, certain types of trailers are equipped with male coupling members or king pins at their front ends to couple with the locking means on the fifth wheel carried by the so-called tractor vehicle. When the king pin coupling means on the trailer is used, the coupling devices on the tractor are female coupling members to cooperate therewith. Other types of trailers, however, are equipped with female coupling means carried thereby to coact with a king pin member mounted on the tractor vehicle fifth wheel.

The purpose of this invention is to provide an auxiliary coupling means on the type of trailer which is ordinarily equipped with a king pin coupling member, the auxiliary coupling means being adapted normally to be adjusted to a position out of use and being of the female coupling type. Thus, with a trailer equipped with a king pin main coupling member and an auxiliary fifth wheel female coupling device, it is possible for my trailer to be employed in conjunction with both those types of tractor vehicles, one of which carries a king pin for coupling purposes and the other of which carries a female coupling device for coupling purposes.

Under the foregoing conditions the provisions of the equipment on my trailer construction allow for the use of the trailer interchangeably with both types of tractor vehicles such as above described.

An advantageous feature of the improvements herein involves the utilization of the king pin or male member on the trailer as a means for holding the female coupling means in operative position when it is desired to use the latter instead of the king pin coupling means.

The invention comprehends additional subsidiary features of construction and detailed forms of parts that cooperate, such as will be hereinafter more fully set forth.

Figure 1 is a side elevation of a trailer embodying my improvements, the auxiliary, alternatively usable fifth wheel female coupling means being adjusted out of use and the main king pin coupling means being in cooperation with the tractor fifth wheel.

Figure 2 is a fragmentary view similar to Figure 1 but showing my auxiliary fifth wheel adjusted so as to be used with a tractor which is equipped with an upstanding king pin on its fifth wheel.

Figure 3 is a top plan view of the parts according to the positions thereof in Figure 1.

Figure 4 is a fragmentary top plan view of the parts shown in Figure 2, according to the adjustments thereof illustrated in Figure 2.

Figure 5 is a bottom plan view of the auxiliary slidingly mounted fifth wheel and coupling means carried by the trailer.

Figure 6 is a top plan view of the devices of Figure 5.

Figure 7 is a transverse sectional view taken on the line 7—7 of Figure 6.

Figure 8 is a longitudinal, sectional view taken on the line 8—8 of Figure 6.

Figure 9 is a fragmentary side elevational view partially in section, showing how the locking means for the auxiliary fifth wheel locks the same in its operative position of use in conjunction with the main king pin on the trailer, and is locked to the king pin on the tractor.

Figure 10 is a front view of the construction of the trailer with the auxiliary fifth wheel in place thereon.

Figure 11 is a view of the latch means employed for holding the lock device that maintains the auxiliary fifth wheel and coupling means in its position of use on the trailer.

Figure 12 is a sectional view of the parts as shown in Figure 11, taken at right angles thereto.

Figure 13 is a perspective view of the plate applied to the bottom of the trailer frame at its front end, upon which plate the auxiliary fifth wheel and coupling means slide.

Referring to the drawings, 1 designates the trailer frame of a known type, 2 the rear wheels, 3 the auxiliary support for the front of the trailer when it is uncoupled from the tractor vehicle, and 4 designates the rear end of a tractor vehicle, the latter having the usual rear wheels 5, but the front wheels of the tractor being omitted. On the front end of the trailer is provided the usual grooved king pin 6 seen best in Figures 8 and 9 and capable of coupling with a split fifth wheel carried by the tractor and designated 7, said split fifth wheel being of the general type shown in United States patent of Martin and Farr, No. 1,412,025. This type of fifth wheel has suitable coupling devices involving locking members that engage the king pin 6 to couple the trailer to the tractor vehicle. Such a fifth wheel for the tractor is designated 7 as aforesaid, and is shown in Figure 1 of the drawings. It is generally known as a split or female fifth wheel of the Martin type and as will be understood by those versed in the art. The fifth wheel 7 is usually a rocking, spring mounted fifth wheel, for well known purposes.

Referring to Figures 1, 3, 4, and 5, and other figures of the drawings particularly, the auxiliary fifth wheel and coupling means employed by the trailer is generally designated at 8. Said means are located in rear of the king pin 6 and as shown in Figure 5, the means 8 embodies a fifth wheel body provided with an entrance split or passage 9 flaring toward the front end and closed at the rear end. Extending across the passage 9 are the locking members 10 which automatically engage with a king pin that may be mounted upon the tractor fifth wheel 11 of the type shown in Figure 2, said king pin being designated 12 and upstanding from the fifth wheel 11. The locking members 10, see Figure 5, are connected by links 13 to levers 14 and the levers 14 are connected to a slide bar 15 operated by a lever 16. By rocking the lever 16 forwardly and pulling the slide 15 rearwardly, the locking members 10 may be caused to recede or move out of the passage 9 and thus release the upstanding king pin with which they may be engaged. Crosswise of the fifth wheel 8 is mounted the lock member 17 and the rear end of the passage 9 of the auxiliary fifth wheel 8 is formed with a flange 18 to enter the groove of the king pin 6. The purpose of the lock member 17 is to hold the auxiliary fifth wheel and coupling means 8 in a position encircling and engaged with the king pin 6 at the front end of the trailer 1 when said king pin 6 is to be put out of service and the auxiliary coupling means 8 is to be put into use. To the above end the member 17 will be movable by a spring 19 to project across the passage 9 in front of the king pin 6 and a handle 20 is provided for manipulating the lock member 17. If desired, in order to hold the lock member 17 engaged by locking action with the king pin 6, a latch plate 21 on the side of the trailer may engage with the handle rod 20 for the member 17 intermediate shoulders 22 on said handle rod.

With the foregoing construction in view, the operation of my invention may be set forth. According to the arrangements of the parts shown in Figure 1, the auxiliary fifth wheel and coupling means 8 is not in use. Instead, the trailer king pin 6 is in cooperation with the female fifth wheel and coupling means 7 on the tractor 4 after the usual manner of cooperation of such parts.

In the above just described tractor-trailer combination the trailer carries the male or king pin member that cooperates with the female coupling means on the tractor, which is one type of tractor-trailer combination.

We shall suppose, however, that the trailer 1 is desired to be used with a tractor fifth wheel such as designated 11 in Figure 2, this tractor fifth wheel having an upstanding king pin 12, or in other words, being of the male type. Of course, under such conditions, the king pin 6 on the trailer cannot be of any value for coupling purposes. Therefore, the auxiliary fifth wheel and coupling means 8 of Figure 1 will be put into use, for which purpose it is slidably mounted on the plate 23 attached to the trailer, there being guides 24 projecting up from the fifth wheel 8 and operating longitudinally in slots 25 of said plate 23. By pushing the auxiliary fifth wheel and coupling means 8 forward until the king pin 6 seats in the rearmost portion of the passage 9, the locking member 17 being temporarily withdrawn for this purpose, the said means 8 will be positioned ready for use. Thereupon the lock device 17 is released so as to pass in front of the king pin 6 and the fifth wheel device 8 is then locked so as to occupy a position with the formerly used king pin 6 near its central axis. With the parts so arranged, the trailer is now ready to engage or be coupled with a tractor fifth wheel apparatus of the male type wherein the king pin 12 projects upwardly from the fifth wheel 11 as in Figure 2. This tractor of this type may be backed into the fifth wheel 8 when arranged as in Figure 2 and Figure 4 and the king pin 12 on the tractor will automatically engage with the locking members 10 at the rear thereof and also engage with the cross locking device 17 at the front thereof. These several parts engaging in the groove portion of the king pin 12 are seen best in Figure 9.

After the parts have been arranged as above mentioned, should it be necessary to use the trailer with a tractor having the split fifth wheel coupling means thereon, all that is necessary to do is to pull out on the locking member 17 and actuate the lever 16 to withdraw the locking members 10 from the passage 9 and then slide the device rearwardly to its position shown in Figure 1, where it will be out of the way and render the king pin 6 available to use with the female coupling means on the tractor.

Any suitable locking contrivance may be employed to hold the auxiliary fifth wheel and coupling means 8 in its rearmost position, and any suitable means may be utilized to position it rearwardly or pull it forwardly as desired. For the latter purpose said device 8 may be equipped with offstanding arms 26.

Having thus described my invention, what I claim as new and desire to secure by Letters Patent of the United States, is—

1. In combination, a trailer, a king pin projecting from the front end portion of the trailer to couple the same with a tractor vehicle, auxiliary coupling means carried by the trailer and having translating movement thereon from operative to inoperative position and vice versa, and normally permitting use of said king pin for the purpose stated, said auxiliary coupling means including a locking device to lock same to the king pin of the trailer to hold said auxiliary coupling means in position for use when said auxiliary coupling means is disposed in operative position.

2. In combination, a trailer, a king pin at the front end of the trailer to couple the trailer with a tractor vehicle, an auxiliary coupling means on the trailer, guide means between the auxiliary coupling means and the trailer to permit sliding of the auxiliary coupling means to a point adjacent the king pin, said auxiliary coupling means including a lock device to engage the king pin and hold the auxiliary coupling means in position for use.

3. In combination, a trailer, a king pin at the front end of the trailer to couple the trailer with a tractor vehicle, an auxiliary coupling means on the trailer, guide means between the auxiliary coupling means and the trailer to permit sliding of the auxiliary coupling means to a point adjacent the king pin, said auxiliary coupling means including a lock device to engage the king pin and hold the auxiliary coupling means in position for use, the auxiliary coupling means housing the king pin aforesaid when said means is in use and coupled to the king pin.

4. In combination, a trailer having a king pin at its front end to couple the same with a tractor vehicle, and auxiliary coupling means on the trailer to cooperate with coupling means on a tractor vehicle, including a fifth wheel carried by the trailer, and female coupling parts on said fifth wheel for engaging a male coupling part carried by the tractor vehicle, said fifth wheel being movably mounted and enclosing said trailer kingpin when the former cooperates with the tractor coupling means.

5. In combination, a trailer having a king pin at its front end to couple the same with a tractor vehicle, and auxiliary coupling means on the trailer to cooperate with coupling means on a tractor vehicle, including a fifth wheel carried by the trailer, coupling parts on said fifth wheel for engaging a male coupling part carried by the tractor vehicle, guiding means intermediate the said fifth wheel on the trailer and the trailer frame permitting sliding of said fifth wheel into a position adjacent the king pin, and locking means on said fifth wheel to interengage the trailer king pin to hold said fifth wheel in place ready for coupling action in relation to coupling parts of the tractor fifth wheel.

6. In combination, a trailer, a king pin at the front end of the trailer, a coupling means acting auxiliarly to the said king pin comprising a fifth wheel having spaced portions and movable on the trailer so that the king pin may enter said spaced portions, a lock on the fifth wheel to engage with the king pin and hold it within the spaced portions of the fifth wheel, and other locking means on the fifth wheel to engage a coupling member of a tractor vehicle received between said spaced portions of the fifth wheel.

7. In combination, a tractor vehicle having coupling mechanism for connecting same with a trailer vehicle, a trailer vehicle having coupling mechanism for connecting same with a tractor vehicle, one of said coupling mechanisms comprising associated male and female fifth wheel parts interchangeably usable, the said female fifth wheel part being movably mounted upon the vehicle which carries same, together with lock mechanism for holding said female fifth wheel part, after shifting of the same, in coupled relation to the male part with which it is associated, whereby said female wheel part may cooperate independently of said male part with the coupling mechanism of the vehicle other than the one which carries said female fifth wheel.

JOHN F. ROBB.